United States Patent [19]

Reikowski

[11] 4,419,908
[45] Dec. 13, 1983

[54] MOLD AND METHOD OF MAKING SPOKED WHEELS AND PRODUCT OF SAME

[75] Inventor: Harold J. Reikowski, Southfield, Mich.

[73] Assignee: Kelsey-Hayes Co., Romulus, Mich.

[21] Appl. No.: 314,541

[22] Filed: Oct. 26, 1981

[51] Int. Cl.³ .......................... B29D 3/02; B29G 7/00
[52] U.S. Cl. ..................................... 74/552; 156/173;
156/194; 156/433; 156/500; 156/581; 249/56;
249/57; 249/83; 249/122; 249/135; 249/160;
264/137; 264/258
[58] Field of Search .............. 264/136, 137, 257, 258;
156/242, 245, 166, 173, 194, 433, 500, 581;
249/56, 57, 117, 122, 135, 160, 83; 74/552, 553

[56] References Cited

U.S. PATENT DOCUMENTS

| 1,843,904 | 2/1932  | Smith et al.   | 264/262 |
| 1,978,985 | 10/1934 | Cobb           | 264/250 |
| 3,966,523 | 6/1976  | Jakobsen et al.| 156/173 |
| 4,294,639 | 10/1981 | Woelfel et al. | 156/194 |

FOREIGN PATENT DOCUMENTS

| 55-91453 | 11/1980 | Japan          | 74/552 |
| 2061848  | 5/1981  | United Kingdom | 74/552 |

Primary Examiner—Willard E. Hoag
Attorney, Agent, or Firm—Ralph J. Skinkiss; William P. Hickey

[57] ABSTRACT

A fiberglass reinforced plastics steering wheel is disclosed and a mold and method for making same. The wheel is made by disposing binder and the fiberglass in an annular cavity and in ramp-like radial cavities of a mold and are pressed into shape by a wedge-shaped member.

11 Claims, 13 Drawing Figures

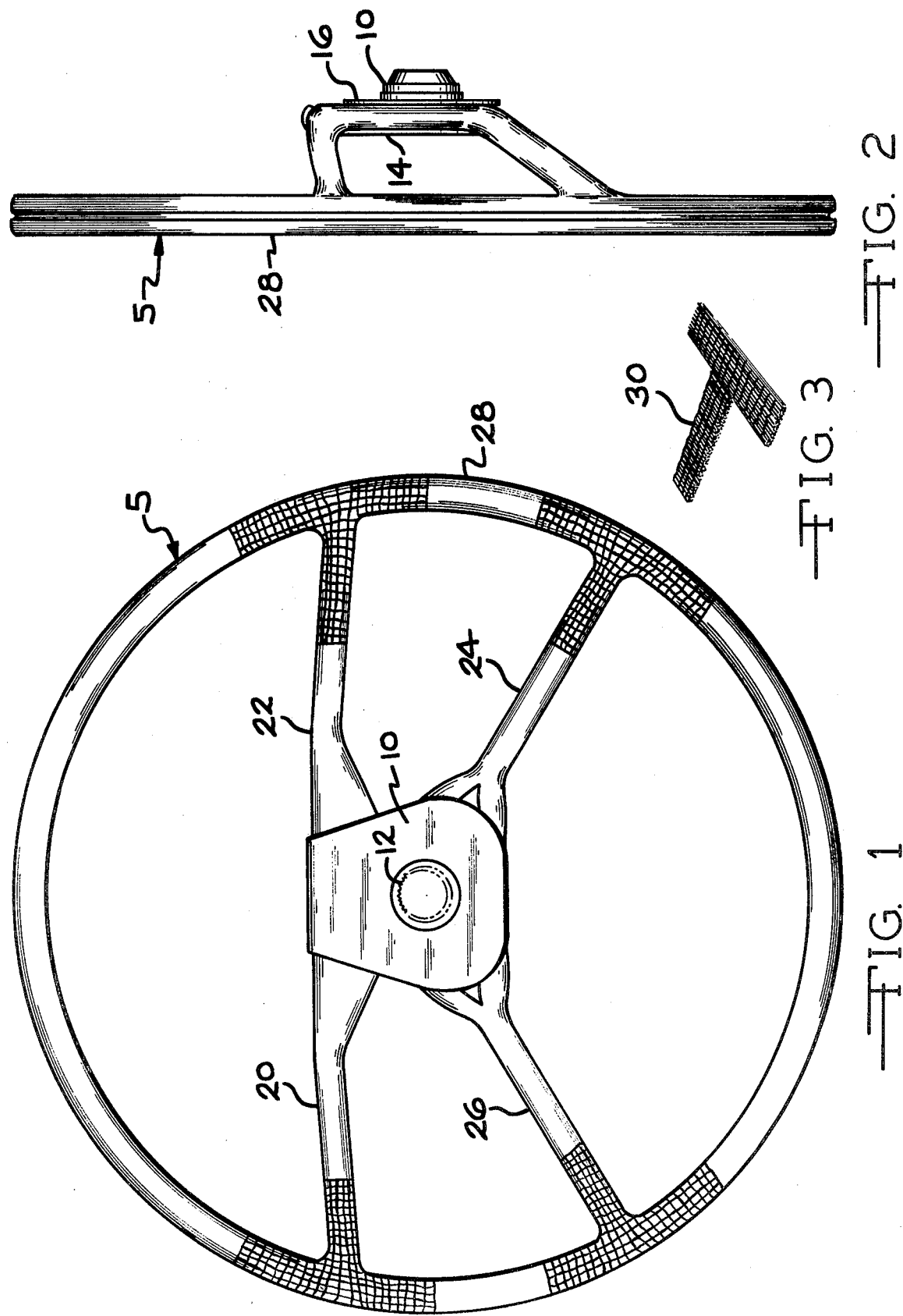

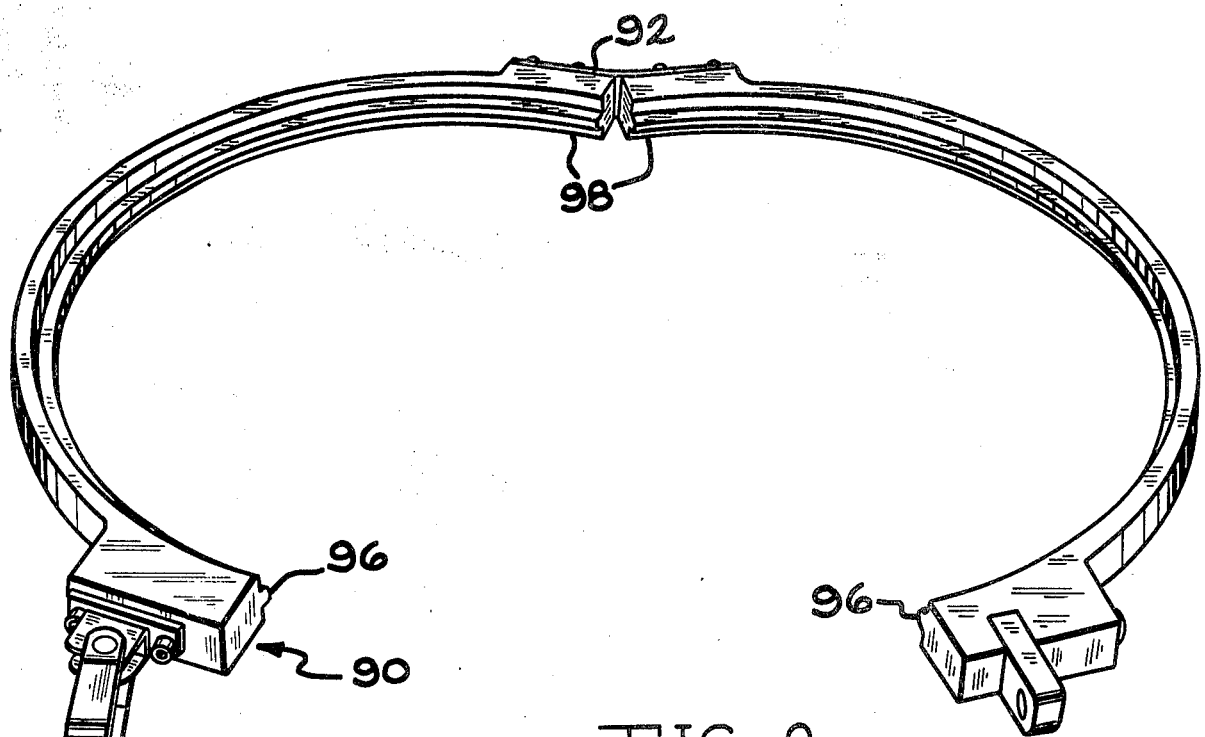
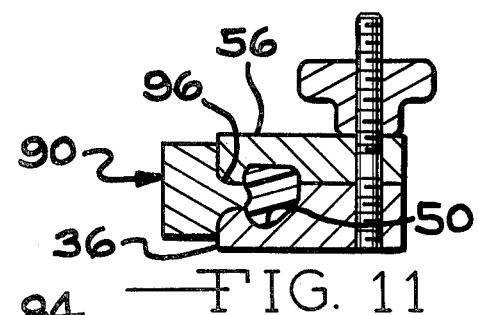
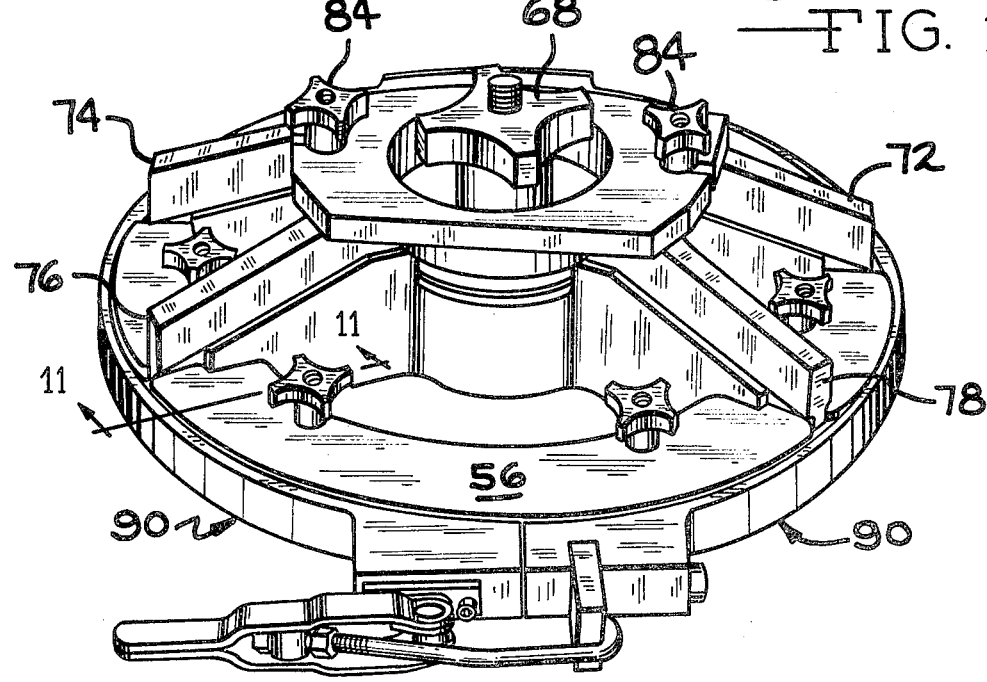

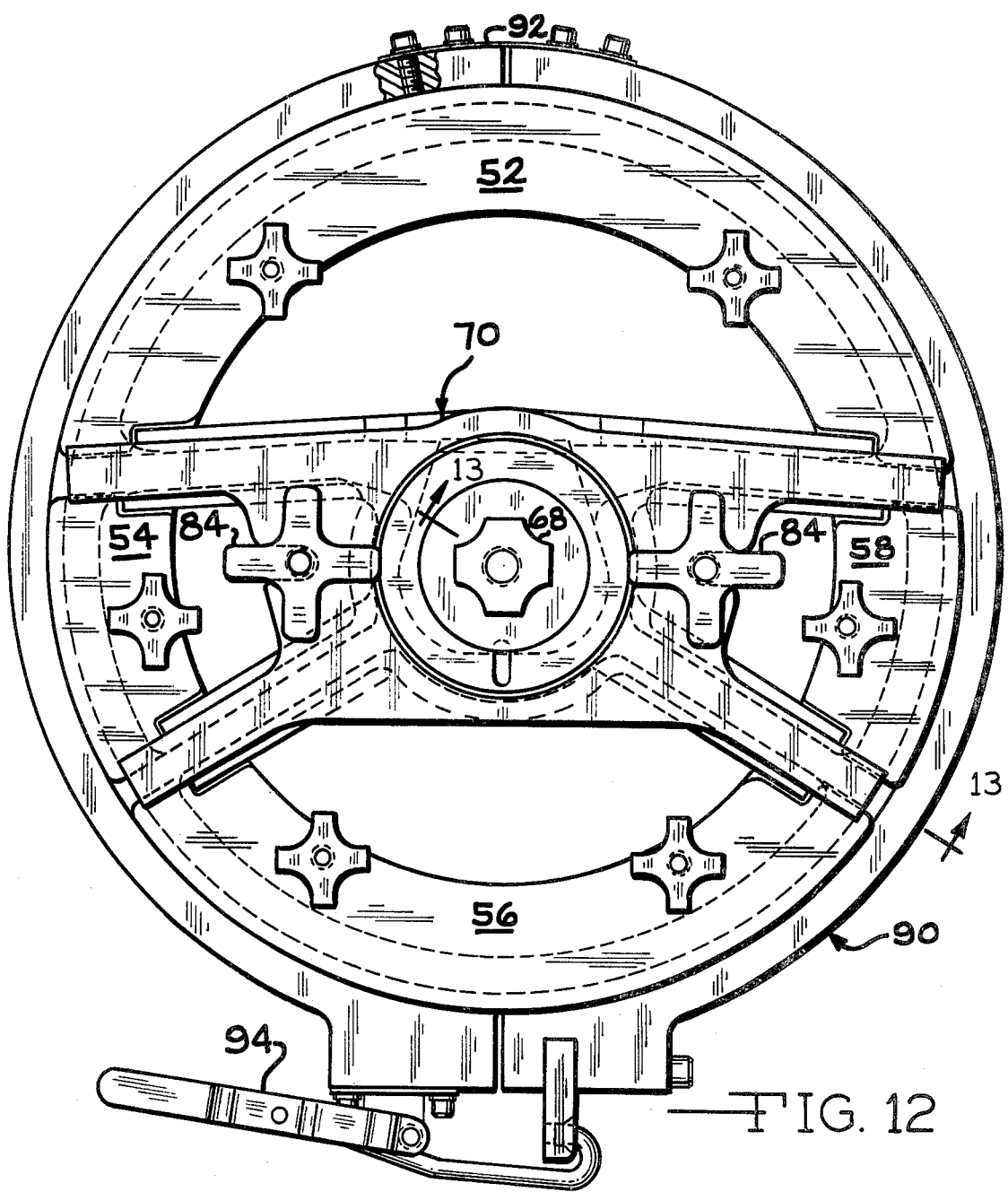
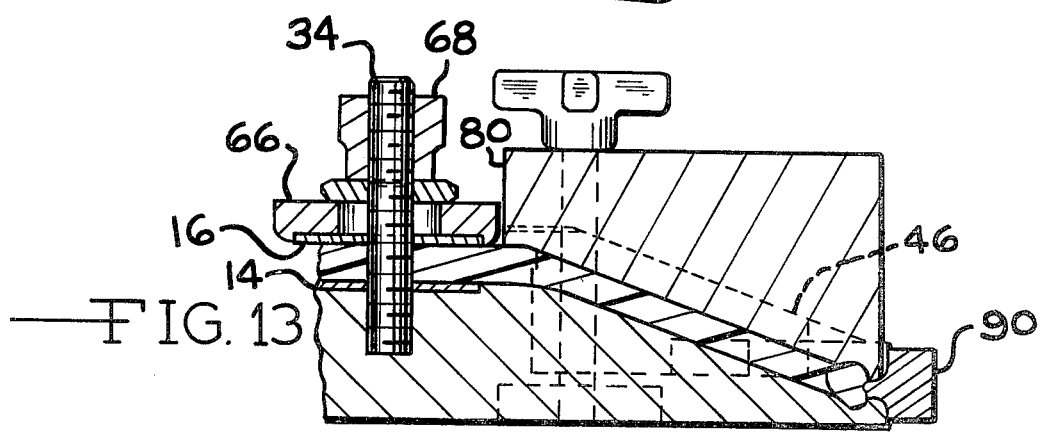

MOLD AND METHOD OF MAKING SPOKED WHEELS AND PRODUCT OF SAME

TECHNICAL FIELD

The present invention relates to method and apparatus for producing spoked steering wheels and the like from binder for consolidated parallel fibers; and more particularly the method and apparatus for producing steering wheels for automotive vehicles and the like.

BACKGROUND OF THE INVENTION

It has been proposed heretofore to produce an automotive steering wheel by conventional filament winding techniques. In doing so, the art has found that, even though the winding pattern is completely random, the filaments, during winding, become pulled or separated into groups, which groups are connected only, if at all, by large unreinforced areas of binder. To my knowledge, there has been no practical way of providing transverse reinforcement in a filament winding molds for such complicated shapes. Further, problems have existed in bonding the parallel filaments to metal hubs; problems have existed in properly filling out cavities; and problems have existed in preventing fiber separation in spokes. One of the most troubling areas occurs where spokes connect to the outer rim of the wheel. When filaments are pulled down the spoke and around the rim, they are pulled out of a random interlock with the fibers proceeding in the opposite direction; so that the fibers turning clockwise are separated and grouped from the fibers going counterclockwise, thereby leaving only binder connecting the two separate groups. What is more, air bubbles may be drawn into the binder as the fibers are pulled into the separate groups thereby leaving inferior air laden binder between the two groups. A still further problem that occurs is that any reinforcement materials that are placed in prior art molds are pulled out of position by strand that is pulled into position during the filament winding process.

An object of the present invention is the provision of a new and improved method of making filament wound wheels wherein an improved positioning of the filament wrappings relative to each other is achieved, and the problem of air entrained in the binder is eliminated.

Another object is the provision of a new and improved method of changing the position of filaments after being wound into a wrapped position without materially relaxing the filaments and without reducing the strength of the final product.

Another object of the present invention is the provision of a new and improved method of making filament wound spoked steering wheels wherein reinforcement is first placed in a mold and the filament winding then accomplished without pulling the reinforcement out of position; and while at the same time distributing the filaments uniformly through out the filament winding mold.

A still further object of the present invention is the provision of a new and improved filament winding mold which permits the above process objectives to be carried out.

Further objects and advantages of the invention will become apparent to those skilled in the art to which the invention relates from the following description of the preferred embodiments taken with the accompanying drawings forming a part of this specification.

BRIEF DESCRIPTION OF THE DRAWINGS

FIG. 1 is a plan view of a filament wound automotive steering wheel armature before the decorative covering is molded thereon.

FIG. 2 is a side view of the armature shown in FIG. 1.

FIG. 3 is an oblique view of a reinforcing pad used in the armature shown in FIG. 1.

FIG. 9 is an oblique view of a compression band that is used in conjunction with the mold shown in FIG. 8.

FIG. 10 is an oblique view showing the parts of FIGS. 8 and 9 fully assembled.

FIG. 11 is a fragmentary sectional view taken approximately on the line 11—11 of FIG. 10.

FIG. 12 is a plan view of the completed mold shown in FIG. 10.

FIG. 13 is an fragmentary sectional view taken approximately on the line 13—13 of FIG. 12.

DESCRIPTION OF THE PREFERRED EMBODIMENTS

Figure 4:
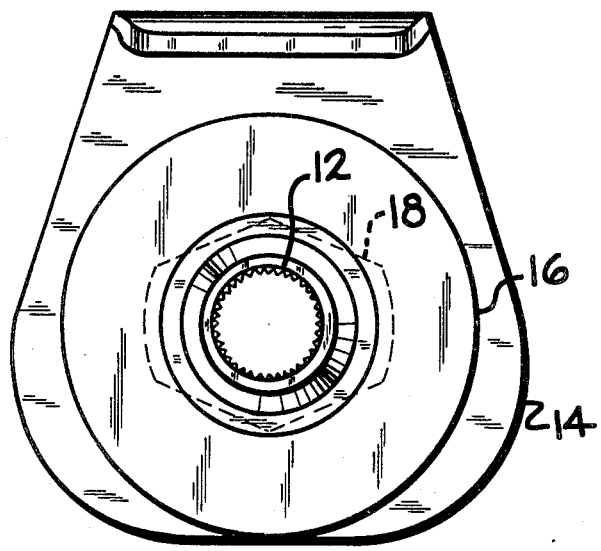
FIG. 4 is a plan view of a metal hub onto which the filaments are wound.
Figure 5:
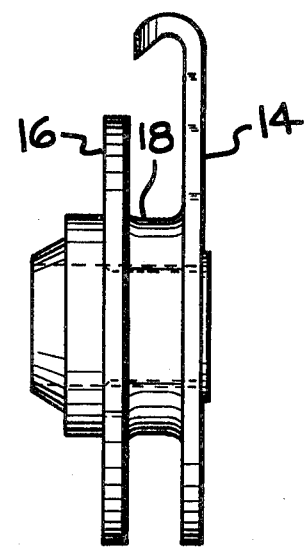
FIG. 5 is a side view of the hub shown in FIG. 4.
Figure 6:
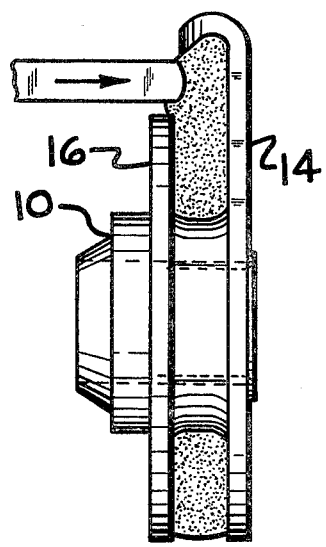
FIG. 6 is a side view similar to FIG. 5, but showing filaments being wound thereon.
Figure 7:
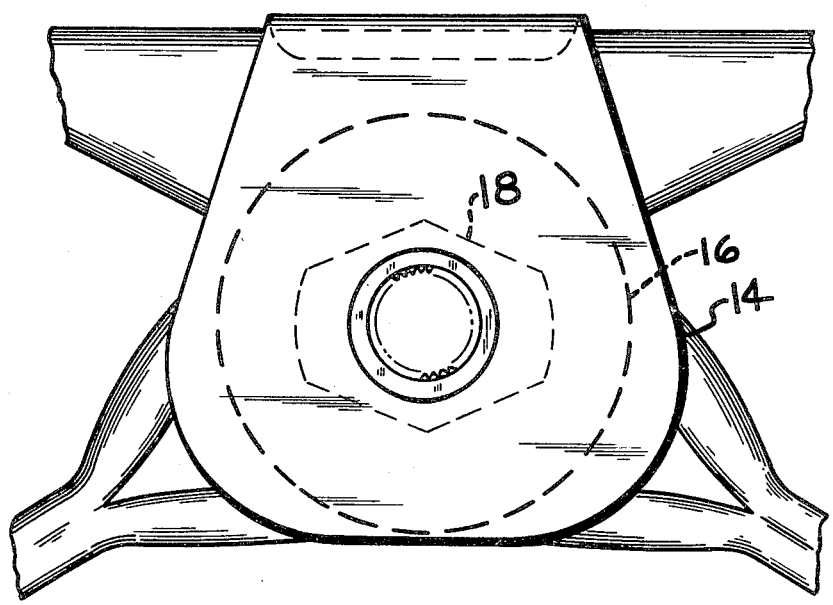
FIG. 7 is a bottom view of FIG. 6 showing filament wound spokes proceeding therefrom.

In applicant's preferred process of producing filament wound spoked wheels, transverse fiber reinforcement pads are placed in the mold at critical locations before the filament winding takes place. In order that these pads are not pulled out of position by the wrappings of strand as they are pulled into position, it is necessary that the mold be specially constructed to feed the strand into the mold free and clear of the pads. One of the critical locations where applicant seeks to use pads is at the juncture of the spokes and rim. Applicant's mold is constructed so that the cavity forming the rim is generally C-shaped having a narrow access passage leading to the periphery of the mold, and having portions of the C-shaped cavity above and below the access opening. The pads are placed in the portion of the C-shaped cavity below the narrow access opening so that the wrappings do not touch the pads as the wrappings enter the cavity. A problem exists with such a C-shaped rim cavity in that the wrappings build up in the center of the C-shaped cavity and do not fill the top and bottom portions of the cavity. Applicant has solved this problem by forcing a wedge shaped instrument into the access opening to wedge wrapplings in opposite lateral directions to fill the top and bottom portions of the C-shaped cavity.

One of the advantages of filament winding, is that it gives a close pack of parallel fibers and that each fiber is taunt to immediately take its share of the load without removing bends as the load is applied. It has been a taboo heretofore to apply a deforming pressure on a filament wound material in a direction which relaxes the fibers before cure. Applicant has found, however, that he can successfully move the windings of the rim laterally without relaxing the filaments to a degree which decreases the strength of the rim. To accomplish this lateral movement, applicant filament winds using a slight excess of resin. The excess resin not only facilitates the shifting of the wrappings by helping to "float" them laterally, but permits "frothy" resin having air entrained therein to be displaced from between the fibers. This leaves the wrappings better consolidated with a much sounder resin between the wrappings, and thus a stronger product. The same occurs in the spokes and hub of the steering wheel armature.

These principles and others will be further explained as they relate to the process and mold for making the steering wheel armature S of an automotive vehicle, shown in FIGS. 1 through 7 of the drawings.

The steering wheel armature S comprises a metal hub 10 having a splined axially extending opening 12 there through for receiving a steering shaft not shown. The hub 10 has spaced apart stop and bottom flanges confining filament windings around the hub. The portion of the hub between the flanges has a noncircular cross section 18 for better torque transmission to the hub. Resin impregnated filaments are wound around the hub, and then pulled tangentially outward at four locations to produce spokes 20, 22, 24 and 26. The spokes run obliquely upwardly to a circular rim 28 where about half of the strands of a spoke turn clockwise into the rim while the other half turn counterclockwise into the rim. Between these groups a void tends to develop so that a spoke juncture with the rim has a pronounced Y-shaped configuration. To reinforce this Y-shaped juncture between a spoke and rim, applicant incorporates a T-shaped pad 30 that preferably comprises laterally extending parallel fibers which are sewn together. The cross bar of the pad extends along the rim, and the stem of the pad extends along the spoke.

The mold for producing the steering wheel armature S above described comprises a pedestal 32 having a threaded post 34 projecting upwardly therefrom to receive a metal hub 10. An annular ring 36 is spaced concentrically about the post 34 opposite the base of the pedestal 32; and ramps 38, 40, 42 and 44 connect the ring 36 to the pedestal 32 at the locations where spokes are to be made. A pair of vertical spaced apart plates 46 and 48 are positioned on opposite sides of each ramp to confine the filament windings into a spoke. A groove 50 for forming the rim 28 of the wheel is formed in the upper peripheral edge of the ring 36. The vertical plates 46 and 48 which form the sidewalls for the spokes stop short of groove 50; and four segmental cover plates 52, 54, 56 and 58 are provided to cover groove 50, except directly opposite the ramps which form the spokes. Segmental cover 52, for example, has one end notched out around vertical plate 46 of ramp 38, and its other end is notched out arund vertical plate 48 of ramp 40. Six studs 60 are provided (two for segmental cover 52) for receiving clamping nuts that are threaded onto the studs to hold the segmental covers in place. Segmental covers 54, 56 and 58 have the ends correspondingly notched out, and are similarly clamped in position. The bottom of the segmental covers 52, 54, 56 and 58 are provided with a groove 62, the configuration of which generally matches that of groove 50, so that the combined cavity is generally C-shaped, and leaving a narrow access channel 64 communicating with the periphery of the mold. Channel 64 has a depth approximately one-third of that of the C-shaped cavity.

The mold as so far described is made ready for filament winding by placing a hub 10 with its large flange 14 down on top of the pedestal 32. A hold down plate 66 is slipped over the post 34 and tightened down upon the flange 16 of the hub by a nut 68. Sufficient clearance exists between the hold down plate 66 and the inner ends of the vertical plates 46 and 48 so that a filament winding finger F (see FIG. 6) carrying a resin coated strand can fit in-between as known in the art. Resin impregnated T-pads 30 are placed in the groove 50 down below the entrance channel 64 with the stem of the pad running up a ramp. The filament winding finger goes around the space between the hold down plate 66 and vertical plates to wrap the hub 10 and then proceeds down between plates 46 and 48 of one of the ramps.

The finger F moves upwardly between the edges of the adjacent segmental covers, then downwardly to overlie the access channel 64, and then proceeds around the channel 64 either clockwise or counter clockwise to another ramp. The finger then proceeds up that ramp around the hub, down another ramp, and around the channel 64, according to a program designed to give a generally uniform thickness of material in the C-shaped groove and ramps. It will be seen that windings fed through the narrow channel 64 will build up into the channel without filling the C-shaped groove.

Figure 8:
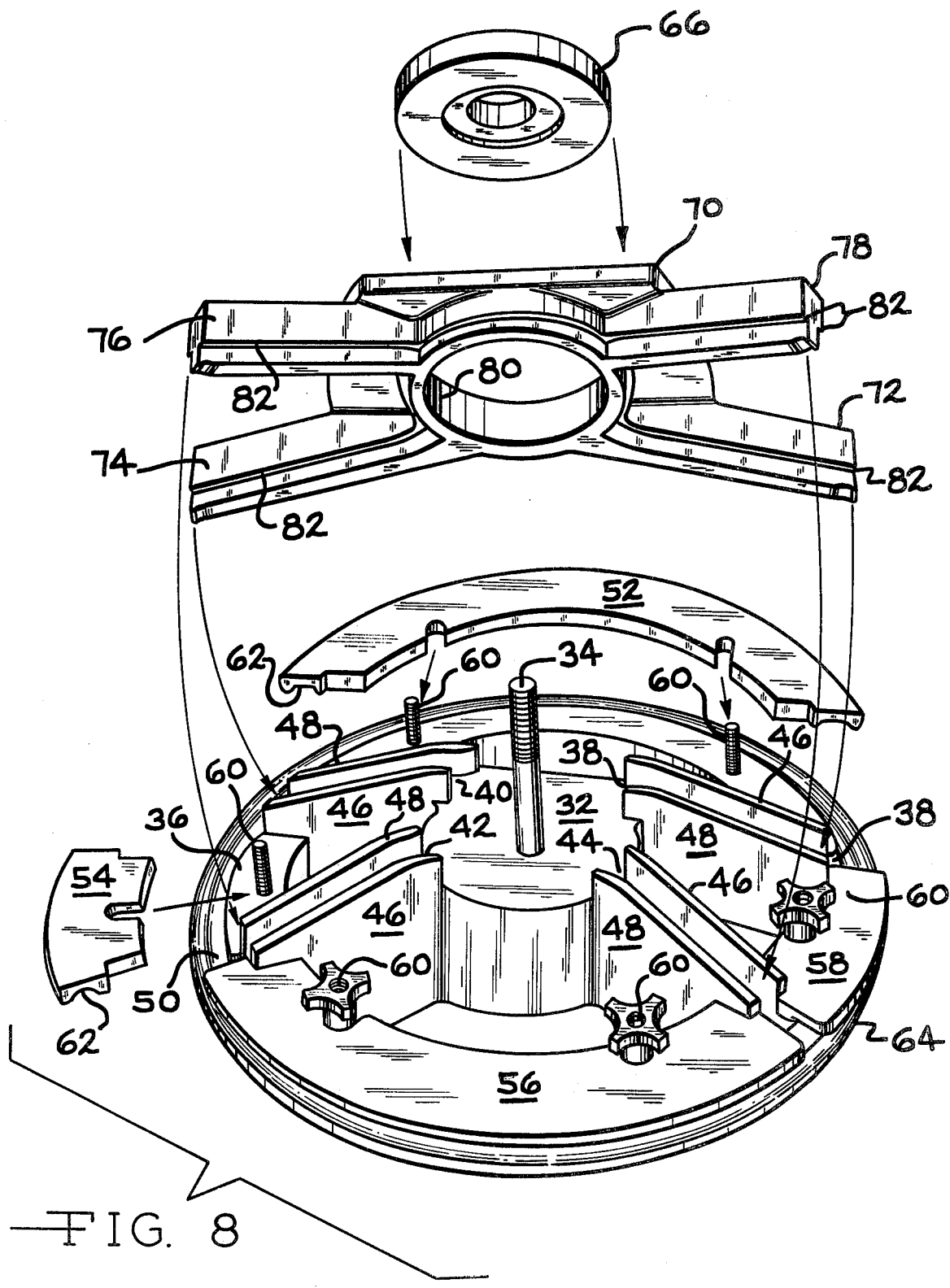
FIG. 8 is an exploded view of the mold used to produce the armature shown in FIGS. 1 and 2.

After the correct volume of windings has been deposited everywhere, a compression spider 70 is placed over the mold and clamped down until its abutment surfaces abut the tops of the plates 46 and 48. The compression spider 70 has four legs 72, 74, 76 and 78 connected at their inner ends by a ring 80 (see FIG. 13) which fits down between the hold down plate 66 and the inner ends of the vertical plates 46 and 48. The bottom of the legs 72–78 of the spider all have a reduced thickness to allow the bottoms thereof to extend down between plates 46 and 48 to compress the materials on the ramps—which of course form the spokes of the wheel to be made. The reduced thickness leaves a pair of shoulders 82 which abut the tops of the vertical plates 46 and 48 along each ramp to limit the compression of materials on each ramp. Two nuts 84 are provided for clamping compression spider 70 in place. As best seen in FIG. 8, the outer ends of the legs of the spider are arranged to extend over groove 50 between cover plates 52–58; and their bottom surface is contoured to conform to groove 62 in the cover plates.

The mold is completed by a compression band 90 (see FIGS. 9–13) which clamps around the periphery of the mold. The band 90 is made in two half sections that are suitably hinged together at one end as at 92, and which are clamped together by a toggle arrangement 94 at their other end. The radial inner surface of each half section is provided with a rounded projection 96 that is adapted to fit into the access channel 64 and wedge the strand wrappings that remain adjacent the access channel 64 laterally upwardly and downwardly to fill the groove 50 in the annular ring 36, and the groove 62 in the segmental cover plates 52–58.

Automotive steering wheel armatures made in the above described mold were fatique tested by a device which imparts three degrees of movement to the armature. The armatures tested were all made using a given formulation of strand soaked in polyester, and are filament wound in the mold according to a predetermined schedule of movements. The armatures are tested by clamping the hubs 10 securely in the position shown in FIG. 1. A test device is clamped to the top of the rim as seen in FIG. 1 midway between spokes 20 and 22; and forces in three mutually perpendicular axes are applied to the test device. This is accomplished by three double acting air cylinders, one arranged to pull axially upwardly with a force of 240 Newtons, and downwardly with a force of 182 Newtons; another radially toward the center with a force of 280 Newtons, and away from the center with a force of 263 Newtons; and another tangentially to the right with a force of 343 Newtons and to the left with a force of 325 Newtons. The cylinders are cycled one hundred times a minute.

Prior to the present invention, steering wheel armatures were made with an access way 64 of the full depth of the rim groove, using flat segmental cover plates with no groove 62 therein. No compression spider 70 or compression band 90 was used; and no reinforcement pads 30 were used, since they could only be applied by a separate operation after the filament winding was done. Such prior art steering wheel armatures failed approximately after 10,000 cycles.

Steering wheel armatures made according to the present invention, using compression spider 70, and compression band 90, but without reinforcement pads 30, withstand at least approximately 40,000 cycles without failure. Armatures made according to present invention using reinforcing pads 30 withstand at least 500,000 cycles without failure. The automotive industry requires a steering wheel to withstand at least 50,000 cycles. For the first time a filament wound steering wheel has been made which meets the established criterion, demonstrating that steering wheels made by this new technology can compete with all steel armatures. Prior to the present development, a number of companies have given up and have closed down their programs to develop filament wound steering wheels.

It can now be seen that the objects heretofore enumerated as well as others have been achieved, and that applicant has produced a new method of making spoked wheels from parallel fibers. It has not been possible heretofore to produce such products using conventional methods. Applicant's techniques for producing an initial lay of filament windings and then shifting the windings to achieve a final deposition is a significant advance in the art. The prior art had taboos in this regard.

While the invention has been described in considerable detail, I do not wish to be limited to the particular embodiments shown and described; and it is my intention to cover hereby, all adaptions, modifications and arrangements thereof which come within the practice of those skilled in the art to which the invention relates, and which fall within the purview of the following claims.

I claim:

1. A method of producing a spoked wheel from parallelly oriented fiber reinforced materials, comprising: providing a mold having a central support with an annular ring thereabout having a mold groove in its top surface adjacent its periphery, and at least two ramps connecting said groove with said central support, placing a segmental cover plate having a mold groove in its bottom surface over the mold groove in said annular ring and leaving an entrance channel between the ring and cover which communicates with the periphery of said ring and cover; placing a hub having parallel top and bottom flanges on said central support; wrapping binder impregnated parallel fibers into said entrance channel up said ramps, and between said flange of said hub until parallel fibers and binder build up in said mold grooves to said entrance channel; and forcing a wedge shaped member into said entrance channel to move the parallel fibers laterally to fill the mold grooves in the annular ring and its cover plate; and hardening the binder.

2. The method of claim 1 including the step of: placing a binder wetted reinforcement pad in the portion of said groove in said annular ring that is beneath said entrance channel and opposite said ramps before pulling the binder impregnated parallel fibers through said entrance channel.

3. An armature for a wheel made by the method of claim 2.

4. The method of claim 1 wherein said forcing step is accomplished by forcing segments of a ring into said entrance channel, and clamping them in position while hardening the binder.

5. The method of claim 4 including the steps of: forcing the parallel fibers and binder that surrounds the top flange of the hub down onto said central support prior to the curing step.

6. The method of claim 5 including: forcing the materials on said ramps downwardly prior to the curing step to move parallel fibers on said ramp laterally into binder bridging abutment with each other, and eliminating excess binder and air therefrom.

7. A mold for producing spoked wheels and the like from parallel filament reinforced binders, comprising: a central pedestal having an upper surface for supporting a hub thereon; a generally annular rim surrounding and spaced apart from said pedestal; at least two ramps connecting said upper surface of said pedestal with said annular rim; a mold groove in the top surface of said annular rim and to which groove said ramps extend; a pair of vertical guide plates for each ramp with respective guide plates being on opposite sides of said ramp; a segmental cover plate for a portion of said groove in said rim between said ramps, said cover plate having a mold groove in its bottom surface which groove overlies said mold groove in said rim, there being a space between said rim and cover plate leading from said grooves to the periphery of said rim to provide an annular access channel to said mold grooves of said rim and cover plate, said access channel having a width that is a fraction of the combined depth of said mold grooves; a collapsible band extending around said rim externally of said access channel, said band having a radially inwardly extending annular projection adapted to fit into said access channel and compact material up into the mold groove of said cover plate and down into the mold groove of said rim; and stop means for limiting the radially inward movement of said annular projection into said access channel to in turn limit the displacement of materials in said mold grooves.

8. The mold of claim 7 including a ramp cover comprising: a pair of ramp cover plates respective ones of which cover respective ramps; a bridge holding said cover plates together; respective cover plates having bottom surfaces which extend down and fit between respective pairs of vertical guide plates on said ramps; and stop means limiting downward movement of said cover plates for said ramps.

9. The mold of claim 8 wherein said cover plates have radially outer bottom surfaces which are contoured to correspond to the mold groove of said segmental cover plate.

10. The mold of claim 8 including an annular hold down plate for a hub on said pedestal, said annular hold down plate having a bottom that is recessed to receive the top of said hub, and which extends radially outwardly of the hub to confine filaments and binder that accumulate in the space radially outwardly of the hub.

11. The mold of claim 10 wherein said bridge for said ramp cover includes an arcuate portion that extends down between said annular hold down plate and said ramp cover plates.

* * * * *